United States Patent [19]
Hubbard

[11] Patent Number: 5,797,623
[45] Date of Patent: Aug. 25, 1998

[54] SMART SKIN SENSOR FOR REAL-TIME SIDE IMPACT DETECTION AND OFF-LINE DIAGNOSTICS

[75] Inventor: James Edward Hubbard, Derry, N.H.

[73] Assignee: Trustees of Boston University, Boston, Mass.

[21] Appl. No.: 552,545

[22] Filed: Nov. 3, 1995

[51] Int. Cl.$^6$ ................................................ B60R 21/32
[52] U.S. Cl. .................. 280/735; 73/763; 73/769; 73/DIG. 4; 307/10.1
[58] Field of Search ........................ 280/734, 735; 307/10.1; 73/DIG. 4, 769, 763

[56] References Cited

U.S. PATENT DOCUMENTS

| | | |
|---|---|---|
| 4,328,441 | 5/1982 | Kroeger, Jr. et al. . |
| 4,565,940 | 1/1986 | Hubbard, Jr. . |
| 4,626,730 | 12/1986 | Hubbard, Jr. . |
| 4,634,917 | 1/1987 | Dvorsky et al. . |
| 4,649,312 | 3/1987 | Robin et al. . |
| 4,868,447 | 9/1989 | Lee et al. . |
| 4,888,581 | 12/1989 | Guscott . |
| 4,935,614 | 6/1990 | Hubbard, Jr. et al. . |
| 5,026,977 | 6/1991 | Hubbard, Jr. . |
| 5,054,323 | 10/1991 | Hubbard, Jr. et al. . |
| 5,159,498 | 10/1992 | Hubbard, Jr. . |
| 5,237,542 | 8/1993 | Burke et al. . |
| 5,327,397 | 7/1994 | Burke et al. . |
| 5,336,959 | 8/1994 | Park et al. . |
| 5,347,870 | 9/1994 | Dosch et al. . |
| 5,359,253 | 10/1994 | Hikmet . |

FOREIGN PATENT DOCUMENTS

| | | |
|---|---|---|
| 0222640 | 5/1987 | European Pat. Off. . |
| 3703630 | 8/1988 | Germany . |
| 3716168 | 11/1988 | Germany . |
| 4135784 | 5/1992 | Germany . |
| 2197121 | 5/1988 | United Kingdom . |
| 2252414 | 8/1992 | United Kingdom . |

OTHER PUBLICATIONS

Patent Abstracts of Japan, vol. 010, No. 116, Apr. 30, 1986.

*Primary Examiner*—Eric D. Culbreth
*Attorney, Agent, or Firm*—Weingarten, Schurgin, Gagnebin & Hayes LLP

[57] ABSTRACT

A low cost, high bandwidth "smart skin" impact sensor is developed for application to vehicle side impact detection and diagnostics. The sensor is based on a piezo polymer smart skin technology and can sense impact location and impact energy in real time (i.e., fractions of a millisecond) along a vehicle side panel. The sensor is simple to manufacture, is low cost in production quantities, and can be used in concert with other devices in a sensor suite to provide, reliable, efficient, energy managed airbag development. With proper spatial shading techniques it is shown that the sensor can be designed also to report impact angle and the velocity of the impacting body.

10 Claims, 2 Drawing Sheets

SMART SKIN SENSOR FOR REAL-TIME SIDE IMPACT DETECTION AND OFF-LINE DIAGNOSTICS

BACKGROUND OF THE INVENTION

1. Field of the Invention

This invention relates to sensors and particularly piezo sensors capable of measuring strain energy, velocity, center of force and angle of impact of collisions, which may in turn be adapted for applications in vehicle airbag systems.

2. Description of the Prior Art

Frontal airbags are now a standard feature in most modern automobiles. Based on a mechanical triggering device originally proposed back in the 1960's, most of today's airbags are controlled by electronic accelerometers. The recent trend in modern airbag design is moving towards sophisticated systems that implement energy management, i.e., the application of less than 100% of the airbag's potential cushioning force upon deployment of the airbag. Based on factors such vehicle speed, intensity of the collision, and passenger weight, the energy managed airbag systems of the future will be deployed at variable rates ranging anywhere from less than 50% of the potential cushioning effect of the airbag to 100% of the cushioning effect of the airbag. These considerations are important inasmuch as the characteristics of the driver or passenger may range in weight from a small infant to a large adult. Today's airbags deploy at only one rate: 100% force. However, in order to be deployed at anything less than 100% force, there is a need for more intelligent, highly integrated, low-cost, high performance electronic sensor technologies.

The design of advanced sensors for side impact airbag deployment is particularly challenging. Side impact airbag systems protect vehicle occupants in the event of a collision with the driver's or passenger's side of the vehicle. These systems are targeted for widespread use by Model Year 1997–1998. Like the frontal impact airbag systems so prominent in today's vehicles, side impact airbag systems detect a collision by measuring accelerations at the side of the vehicle.

In a typical side impact airbag application, an accelerometer is located within an electronic control module inside the door panel or near the door of the vehicle. The accelerometer senses the side impact. The electronic control module continuously monitors the output of the accelerometer and interprets this data to look for the electronic signature of a crash.

The dynamics of a side impact, and particularly a side impact on a door, are such that once the vehicle side door is hit, the door beam and outer panel deform significantly while the passenger compartment only gains a relatively small velocity change in the early stages of the crash. This difference in velocity between the side door and the passenger compartment manifests itself in the deformation or crush of the vehicle. Conventional accelerometers are typically located at three places on the door: one immediately in front of the side door in the so-called A-pillar, one immediately behind the side door or in the B-pillar, and one at the center of the side door.

When a crash is detected, the side impact airbags are inflated to provide additional protection to the vehicle's occupants. Because the dynamics involved in a side impact are significantly different from that of a front or rear impact, unique sensors are required for reliable side airbag deployment. Sensor-based companies are striving to build intelligent, low cost, highly integrated sensors for such an application, but to date few such devices are available.

Prior art side airbag sensing systems are designed so that upon a side impact, hopefully at least one accelerometer sensor will trigger. In actual practice, the side impact often does not jar any of the accelerometers to the degree necessary to create a crash signature. This occurs especially when none of the accelerometers are directly hit by the colliding vehicle. Consequently, side impact airbag deployment systems, though attractive in theory, more often than not prove unreliable in practice.

SUMMARY OF THE INVENTION

It is an object of the present invention to provide a side impact airbag deployment sensor which is responsive to a side impact regardless of the location of the impact along the door panel and regardless of the velocity of the impact.

It is a further object of the present invention to provide a sensor capable of determining the energy of a side impact.

It is a further object of the invention to employ a piezo polymer sensor along an automobile's door panel to sense a side impact and to activate side airbags when certain characteristics of the side impact exceed predetermined threshold values.

It is a further object of the present invention to provide a sensor capable of determining the speed or velocity of a side impact.

It is a further object of the present invention to provide a sensor capable of determining the angle of a side impact.

It is a further object of the present invention to provide a sensor capable of determining the location or center of force along the door panel in a side impact.

It is still further yet an object of the invention to apply the determination of the energy, the impact angle and the location of the impact along a piezo polymer skin for deploying an airbag system on an automobile.

The sensor is based on the use of a piezo polymer smart skin technology and can sense impact location and impact energy in real time (i.e., fractions of a millisecond) along a vehicle side panel. In addition, when coupled with off-line diagnostics, the impact angle and speed of the side impacting vehicle can be determined. These later two quantities (impact angle and speed) could be important for insurance purposes to assist in determining who, if anyone, was at fault in the collision.

The deformation sensitive "crush sensor" for sensing side impacts is placed on the side door structure for effective and reliable airbag deployment. This location is essential since it is sensing the velocity change of the portion of the vehicle which will eventually strike the occupant. The dynamics between the struck and striking vehicle are functions of the impact location and angle, the impact energy as manifested by the impact speed, and the stiffness and weights of the colliding vehicles. The sensor is simple to manufacture, is low cost in production quantities, and can be used in concert with other devices in a sensor suite to provide reliable, efficient, energy managed airbag deployment system.

DETAILED DESCRIPTION OF THE PREFERRED EMBODIMENT

Figure 1:
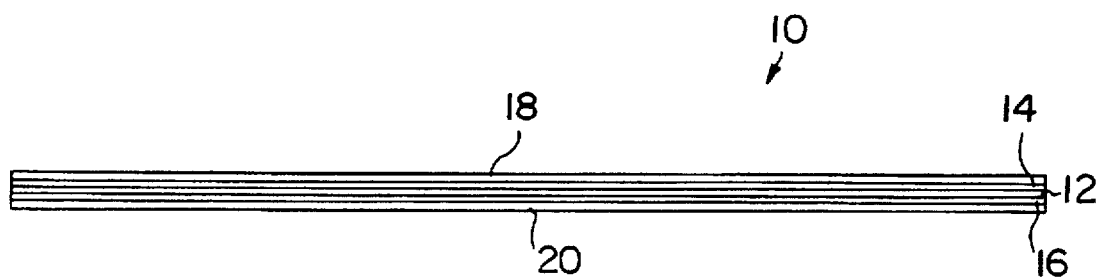
FIG. 1 is a schematic illustration of the piezo sensor film architecture according to a preferred embodiment.
Figure 2:
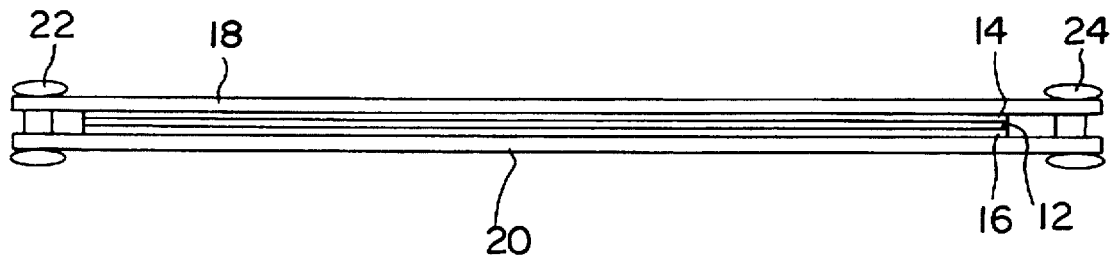
FIG. 2 is a schematic illustration of the sensor architecture showing faceplates attached thereto.

FIG. 1 is an illustration of the basic sensor architecture. The sensor 10 is comprised of piezo layer (or film) 12 positioned between a pair of opposed, substantially parallel conductive layers 14, 16. However, other sensor materials could be used instead of a piezo polymer film. For instance, piezo crystals, fiber optics, strain gauges or any other electro-active material which generates an electrical output upon receiving an impact force may be used as the sensor material. One of the conductive layers is a substrate electrode 14 while the other is a sensor electrode 16. A pair of sensor support substrates 18, 20 are provided on the outside of the electrodes. Sensor support substrates 18, 20 are preferably metal faceplates of 15/1000 in. thickness and about 2 ft. in length. Sensor support substrates 18, 20 are preferably clamped along a periphery thereof. For instance, rivets 22, 24 (as seen in FIG. 2) are one example of a clamping device that might be used to clamp faceplates 18, 20. The clamped boundaries of the faceplates 18, 20 ensure that, regardless of the angle of impact on the faceplate, the only force transmitted to the piezo film 12 is in a direction normal to the plane of the surface of the piezo film. In other words, the force is applied to the piezo film 12 in what is commonly referred to as the "3—3" direction. In addition, the sensor support substrates 18, 20 preferably have one side coated with an insulating material and the other side forming a ground plane. The entire sensor structure is thus sandwiched between two thin metal faceplates, both of which are grounded and thus provides effective EMI shielding of the film for improved signal to noise response and environmental isolation.

The principle transduction element of the sensor preferably consists of a piezoelectric polymer, polyvinylidene fluoride or PVDF film. This film's electrical response is such that when it is subjected to an applied normal strain field, a resultant charge distribution q(x,t) appears on the surface of the film according to the relationship:

$$q(x,t) = \left[ \frac{k_{33}^2}{g_{33}} \right] \cdot e_{film}(x,t) \tag{1}$$

where;

$e_{film}(x,t)$=applied normal strain acting on the PVDF layer;
$k_{33}$=electromechanical coupling coefficient
$g_{33}$=piezoelectric strain constant of the PVDF layer normal to the plane of the sensor or along the 3—3 coordinate direction.

Figure 3:
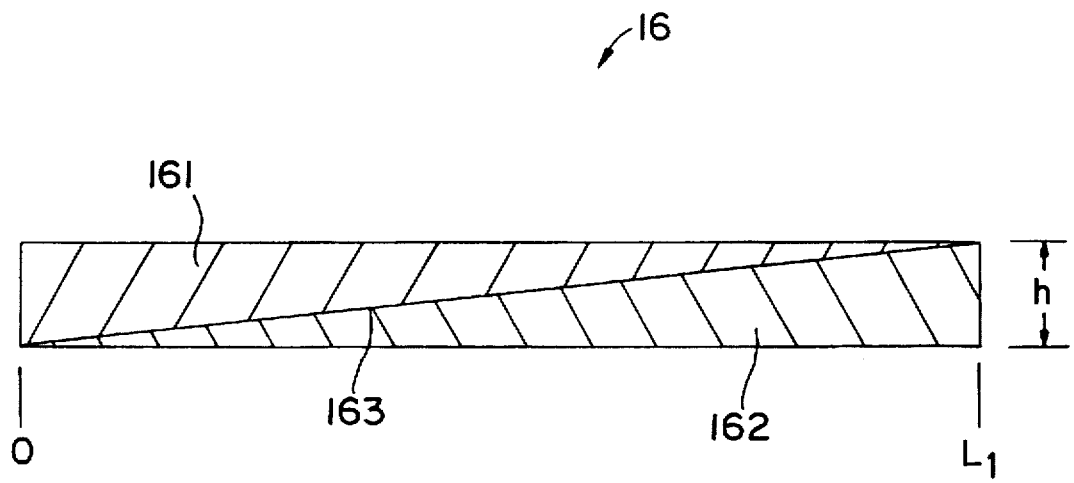
FIG. 3 is a top plan schematic view of the sensor electrode according to the preferred embodiment.

The substrate electrode 14 acts as a ground electrode during charge collection. As seen in FIG. 3, the sensor electrode 16 is a spatially shaped charge collecting electrode. Sensor electrode 16 is a composite laminate having an electrode 161 and a electrode 162. The 161 and 162 electrodes have a linear boundary 163 therebetween. Along the length of the sensor electrode between 0 and $L_1$, the 161 and 162 electrodes vary in height h according to an inverse relationship. That is, as one electrode becomes smaller, the other becomes proportionally larger. It will be readily appreciated by those skilled in the art that separate leads are run from electrode 161 and electrode 162 to obtain linear weighting. In addition, it will be appreciated that an impact closer to point 0 will result in a relatively small voltage output for electrode 162 and a relatively large voltage output for electrode 161. The reverse occurs as the impact occurs closer to point $L_1$. The shaped electrode 16 appropriately weights and integrates accumulated charge Q(t) according to the following equation:

$$Q(t) = \frac{k_{33}^2}{g_{33}} \int_D b(x) \cdot e_{film}(x,t) \cdot dx \tag{2}$$

where;

Q(t)=Sum total of all charge produced on the PVDF surface as a result of an applied compressive strain field and;

b(x)=spatial profile of the charge collecting electrode as defined over the working aperture of the sensor.

The active PVDF sensor core 12, since it is grounded on both sides thereof to provide effective EMI shielding, is equivalent to a simple dielectric material located between two electrodes. A sensor output voltage $v_0(t)$ may, therefore, be derived based on a simple capacitor model:

$$v_0(t) = \frac{Q(t)}{C_{sensor}} \tag{3}$$

where;

$C_{sensor}$=total sensor capacitance.

Substituting Q(t) from equation (2) into equation (3), the resulting multi-layered, laminated skin thus effectively generates a spatially weighted output voltage $v_0(t)$ whose value is proportional to the applied strain field.

The foregoing analysis assumes that the impact loading of the sensor 10 results primarily in an applied normal strain (along the 3—3 coordinate direction) on the PVDF core 12, and that no shearing of the active core, i.e., PVDF film, material occurs. In order to ensure this, the sensor 10 is preferably designed so that the in-plane or longitudinal displacements of both the top and bottom faceplates 18, 20 are identical. This will prevent shear strain in the active core 12 of the sensor 10 and the total shear force acting on the PVDF film 12 is negligible. The rivet bonding 22, 24 along the peripheral edges of the faceplates as shown in FIG. 2 accomplishes this objective. In addition to preventing PVDF core shear stresses, the faceplate end boundary conditions also ensure that any lateral deflection of the sensor 10, as a result of an impact load on the door beam, will cause purely compressive forces in the sensor core 12, thus generating a purely normal strain on the active PVDF.

With faceplate 18 rigidly bonded to the lateral door beam, considerations of force continuity in this system reveal the following relationship between the lateral door beam displacement that occurs during impact and the concomitant displacement across the PVDF sensing film 12:

$$y_{film}(x,t) = \frac{K_{fp1}}{K_{film} + K_{fp1}} \cdot y_{door}(x,t) \tag{4}$$

where;

$y_{film}(x,t)$ displacement across the film,
$K_{film}$=spring constant of PVDF film layer,
$K_{fp1}$=spring constant of sensor faceplate 20, and
$y_{door}(x,t)$=lateral deformation along the door due to impact.

Inasmuch as faceplate 18 is bonded directly to the door beam, the stiffness $K_{fp2}$ of faceplate 18 is not a factor in determining the sensor output as it is driven directly by the door beam displacement. Only the relative stiffness $K_{fp1}$ of the outer faceplate or faceplate 20, as compared to the film stiffness $K_{film}$, contributes to the applied strain field seen by the active PVDF core 12. If, for example, the film stiffness $K_{film}$ was zero, large film displacements $y_{film}$ are theoretically possible. If, on the other hand, the film stiffness $K_{film}$ was large compared to that of faceplate 20, small film displacements $y_{film}$ would occur (the denominator on the right hand side of equation (4) would be large) and only relatively low sensor output levels would be obtained. If the film 12 and faceplate 20 have the same stiffness ($K_{film}=K_{fp1}$), film displacement $y_{film}$ would be one-half that of the door beam. A design trade-off must therefore be made which provides good signal-to-noise ratio as well as sensor performance robustness and longevity.

For purposes of the following analysis, the target vehicle is comprised of two relevant parts: the side door beam and outer panel, and the passenger compartment. Once the side door is hit by the impacting vehicle, the door beam and outer panel deform significantly while the passenger compartment receives only a small increase in velocity during the initial stage of the impact. Neglecting the inertia of the elements of the door, and assuming no dissipation of energy during the initial stage of the impact, the maximum strain energy $U_{door}$ acquired by the door is equal to the original kinetic energy of the impacting vehicle. Expressed as an equation, this yields:

$$U_{door}(t) = \int_D P_{door}(x,t) \cdot dx = \frac{1}{2} m_0 v_{norm}^2(t) \qquad (5)$$

where;

$m_0$=mass of the impacting vehicle,
$v_{norm}$=normal velocity of impacting vehicle, and
$P_{door}(x,t)$=impact force on the door.
More specifically for the door beam, $$P_{door}(x,t) = K_{door} \cdot Y_{door}(x,t) \qquad (6)$$

where;

$K_{door}$=stiffness of door beam and panel,
$y_{door}(x,t)$=lateral deformation along the door due to impact.

Substituting equation (6) into equation (5), the strain energy $U_{door}$ is given as:

$$U_{door}(t) = K_{door} \int_D y_{door}(x,t) \cdot dx \qquad (7)$$

If sensor 10 is rigidly attached as a smart skin to the door beam, it is constrained to assume the door beam's deformation profile. During the initial stages of impact, a linear elastic deformation of the door beam may be assumed, which in turn causes lateral deformation of the sensor 10 and results in an applied normal strain field $e_{film}$ acting upon the PVDF core 12 as given by;

$$\epsilon_{film}(x,t) = \frac{y_{film}(x,t)}{h_0} \qquad (8)$$

where;

$h_0$=PVDF film thickness, and
$y_{film}(x,t)$=film deformation due to applied force.

The sensor-door boundary conditions as expressed in equation (4) yielded the following force continuity:

$$y_{film}(x,t) = \frac{K_{fp1}}{k_{film} + K_{fp1}} \cdot y_{door}(x,t) \qquad (9)$$

From equations (2), (3) and (8) the resulting sensor voltage output $v_0(t)$ is given by;

$$v_0(t) = \frac{k_{33}^2}{h_0 \cdot g_{33} \cdot C_{sensor}} \int_D y_{film}(x,t) \cdot dx, \qquad (10)$$

where the electrode 16 profile has been chosen such that b(x)=1, which is simply that of a spatially uniform electrode distribution.

Equations (9) and (10) may then be combined to yield;

$$v_0(t) = G_1 \int_D y_{door}(x,t) \cdot dx \qquad (11)$$

with the gain constant G1 defined as follows;

$$G_1 = \frac{k_{33}^2 \cdot K_{fp1}}{(k_{film} + K_{fp1}) \cdot h_0 \cdot g_{33} \cdot C_{sensor}}. \qquad (12)$$

Using equations (5), (6) and (11), the total strain energy $U_{door}(t)$ of the side impact can now be determined from the sensor output:

$$U_{door}(t) = \text{strain energy} = \frac{K_{door} \cdot v_0(t)}{G_1}. \qquad (13)$$

The impacting vehicle mass can be obtained from off-line diagnostics (i.e., the mass of vehicles generally are known, and thus can be input at a later time), so the normal velocity $v_{norm}(t)$ of the impacting vehicle can be determined by combining equation (13) with equation (5):

$$v_{norm}(t) = \text{impacting vehicle normal velocity} = \sqrt{\frac{2 \cdot K_{door} \cdot v_0(t)}{m_0 \cdot G_1}}. \qquad (14)$$

Since the analysis thus far has been restricted to normal or 3—3 strain components, the velocity component of the impacting body is described in terms of the plane normal to the piezo film 12. Moreover, the results obtained thus far have all been based on a spatially uniform charge collecting electrode 16 or more specifically, the parameter b(x) in equation (2) having a value of unity. The electrode 16 of FIG. 3, on the other hand, may also be used in non-spatially uniform applications. Impact location or "Center of Force" along the door beam can be obtained by simply linearly weighting and normalizing the output response given by equation (2).

By simply dividing a uniform electrode along its longitudinal diagonal, an electrode as depicted in FIG. 3 is obtained. Separate electrode leads are run from electrode 161 and electrode 162. Two possible electrode candidates 161, 162 for a linear weighted distribution are formed thereby. More specifically electrode 161 can be described as follows, $$b(x) = b_0(L_1 - x) \qquad (15)$$

where;

$b_0$=generalized spatial gain constant,
x=position on the sensor 16 along the x coordinate between 0 and $L_1$ (FIG. 3),
and
$L_1$=the characteristic length of the sensor working aperture.

Similarly, electrode 162 is described by $b(x)=b_0 x$ and equation (2), for electrode 162, can now be written as;

$$Q_{LIN}(t) = \frac{k_{33}^2 \cdot b_0}{g_{33}} \int_0^{L_1} x \cdot \epsilon_{film}(x, t) \cdot dx. \qquad (16)$$

where;

$Q_{LIN}$ is the accumulated charge of the linearly weighted sensor electrode 162.

Similarly, using equation (11) with the spatial weighting factor b(x) in equation (2), the voltage output $V_{LIN}$ from the linearly weighted sensor electrode 162 is given by;

$$v_{LIN}(t) = G_1 \cdot b_0 \int_D x \cdot y_{door}(x, t) \cdot dx. \qquad (17)$$

Now, the impact location or so-called Center of Force (COF) is obtained as the ratio of equations (17) and (11) (with equation (11) using a spatially uniform electrode distribution), that is;

$$COF(t) \underset{0 \Rightarrow \frac{b_0}{b_1}}{\underbrace{\frac{b_0}{b_1}}} \equiv \text{impact location} = \frac{b_0 \cdot \int_0^{L_1} x \cdot y_{door}(x, t) \cdot dx}{b_1 \cdot \int_0^{L_1} y_{door}(x, t) \cdot dx}. \quad (18)$$

In equation (18), the numerator represents a linearly or spatially weighted electrode, i.e., representative of electrode 162. The denominator in equation (18), on the other hand, represents a uniform electrode, i.e., using the entire sensor electrode 16 without accounting for linear weighting. If, for example, both spatial gain constants $b_0$ and $b_1$ are chosen to be unity, then the COF sensor output will vary from 0 to 1 as the impact location varies from 0 to $L_1$ (FIG. 3) along the working aperture of the sensor 10.

The impact velocity along the axis of the sensor, or tangential impact velocity $v_{tan}$ component can be obtained by taking the first derivative of impact location COF;

$$v_{tan}(t) = \text{tangenital impact velocity} = \quad (19)$$

$$\frac{d}{dt}\left[\frac{b_0 \cdot \int_0^{L_1} x \cdot y_{door}(x, t) \cdot dx}{b_1 \cdot \int_0^{L_1} y_{door}(x, t) \cdot dx}\right];$$

The impact angle may therefore be determined from, $$\tan^{-1}\left(\frac{v_{norm}}{v_{tan}}\right) = \theta_{impact}. \quad (20)$$

Figure 4:
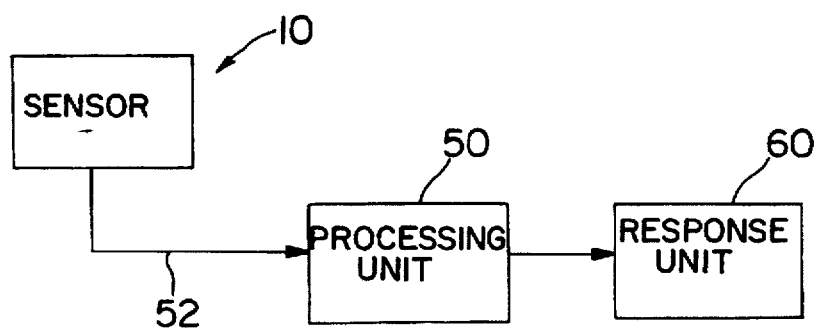
FIG. 4 is a schematic block diagram of the sensor system electrically coupled to a control unit which in turn is coupled to a response unit for airbag deployment.

It will be readily appreciated by those skilled in the art that a suitable processor will be electrically connected to the sensor electrode 16 to determine the energy, tangential velocity and location of impact along the smart skin piezoelectric sensor. For instance, as shown in FIG. 4, sensor 10 is connected to processor 50 via electrical bus 52. Processor 50 is programmed to compute, based on the potential difference across electrodes 14, 16, the total strain energy, the tangential velocity and location/center of force of the impact. The processor manipulates the foregoing electrical signals to realize a real-time measuring system, and depending on the results of the energy, tangential velocity and location/center of force of impact, a response unit 60 may be activated to deploy the side impact air bag system alone or in conjunction with other safety mechanisms. In addition, off-line diagnostics may be used to determine the angle of impact and the normal velocity of the impact once the mass of the impacting vehicle is input into the diagnostic equipment.

A low cost, high bandwidth "smart skin" impact sensor according to the foregoing description is developed for application to vehicle side impact detection and diagnostics. The sensor is based on a piezo polymer smart skin technology and can sense impact location and impact energy in real time (i.e., fractions of a millisecond) along a vehicle side panel. The sensor is simple to manufacture, is low cost in production quantities, and can be used in concert with other devices in a sensor suite to provide reliable, efficient, energy managed airbag deployment. With proper spatial shading techniques, it has been shown that the sensor can be designed also to report impact angle and the velocity of the impacting body.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. An apparatus for sensing data characteristic of an impact of an object in an impact area comprising:

a ground electrode positioned in the impact area;

a piezo polymer film at least partially disposed on and secured to said ground electrode;

a sensor electrode positioned to overlay at least a portion of said piezo polymer film in the impact area; and means for sensing total strain energy of the impact on said piezo polymer film based on the potential difference across said ground electrode and said sensor electrode.

2. The apparatus of claim 1, wherein the impact area is substantially planar, and further comprising means for sensing the velocity component of the impacting object in the direction normal to the impact area.

3. The apparatus of claim 1 further comprising means for sensing the impact location along said sensor electrode.

4. The apparatus of claim 1, wherein the impact area is substantially planar, and further comprising means for sensing the angle with which the object impacts said sensor electrode with respect to the direction normal to the impact area.

5. The apparatus of claim 1, wherein said sensor electrode comprises a first elongated sensor electrode attached along an elongated edge thereof to an elongated edge of a second elongated sensor electrode, said sensor electrode having a uniform width across the length thereof.

6. The apparatus of claim 5, wherein said first sensor electrode has a width linearly varying across the length thereof.

7. The apparatus of claim 5, wherein said second sensor electrode has a width linearly varying across the length thereof.

8. The apparatus of claim 5, wherein said first sensor electrode has a width linearly varying in inverse proportion to the width of said second sensor electrode along the length of said sensor electrode.

9. The apparatus of claim 1, wherein said sensor is substantially planar, and further comprising first and second substantially planar sensor faceplates, said first sensor faceplate overlaying said ground electrode and said second sensor faceplate overlaying said sensor electrode.

10. The apparatus of claim 9, wherein said first sensor faceplate is substantially completely overlaying said ground electrode and said second sensor faceplate is substantially completely overlaying said sensor electrode, and wherein said first and second faceplates are fixedly secured to each other along the perimeters thereof outside the perimeters of said ground and sensor electrodes.

* * * * *

UNITED STATES PATENT AND TRADEMARK OFFICE
CERTIFICATE OF CORRECTION

PATENT NO : 5,797,623
DATED : August 25, 1998
INVENTOR(S) : James E. Hubbard, Jr.

It is certified that error appears in the above-identified patent and that said Letters Patent is hereby corrected as shown below:

Title Page, item [75] reads, "Inventor: James Edward Hubbard"

should read --[75] Inventor: James E. Hubbard, Jr.--

Column 4, line 42 reads, "$y_{film}(x,t)$ displacement"

should read --$y_{film}(x,t)$=displacement

Signed and Sealed this

Twenty-seventh Day of March, 2001

Attest:

NICHOLAS P. GODICI

*Attesting Officer*  *Acting Director of the United States Patent and Trademark Office*